US012683805B2

(12) United States Patent
Cameron et al.

(10) Patent No.: US 12,683,805 B2
(45) Date of Patent: Jul. 14, 2026

(54) QUANTUM-SAFE CRYPTOGRAPHY FOR DIGITALLY SIGNED VOCAL CONTRACTS

(71) Applicant: International Business Machines Corporation, Armonk, NY (US)

(72) Inventors: Caroline K. Cameron, Durham, NC (US); Ray Anderson, Decatur, GA (US); Elizabeth Anne Dames, Harrisburg, NC (US); Madhu Pavan Kothapally, Warangal (IN); Tiberiu Suto, Franklin, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/295,632

(22) Filed: Apr. 4, 2023

(65) Prior Publication Data

US 2024/0340185 A1 Oct. 10, 2024

(51) Int. Cl.
H04L 29/06 (2006.01)
H04L 9/32 (2006.01)

(52) U.S. Cl.
CPC .......... H04L 9/3252 (2013.01); H04L 9/3263 (2013.01)

(58) Field of Classification Search
CPC ... H04L 9/3252; H04L 9/3263; H04L 9/3231; H04L 9/3247
See application file for complete search history.

(56) References Cited

U.S. PATENT DOCUMENTS

| | | | | |
|---|---|---|---|---|
| 10,425,401 B1 * | 9/2019 | Pecen | ................. | H04L 63/0815 |
| 10,742,420 B1 * | 8/2020 | Griffin | ................. | H04L 9/3093 |
| 10,880,093 B1 | 12/2020 | Rakowicz et al. | | |
| 11,294,991 B2 | 4/2022 | Savanah et al. | | |
| 2009/0117879 A1 | 5/2009 | Pawar et al. | | |
| 2015/0278820 A1 | 10/2015 | Meadows | | |

(Continued)

FOREIGN PATENT DOCUMENTS

| | | | | |
|---|---|---|---|---|
| CA | 3065463 A1 * | 6/2021 | ............... | H04L 9/50 |
| CN | 114710293 A | 7/2022 | | |

(Continued)

OTHER PUBLICATIONS

Szymanski, Ted H. "The "cyber security via determinism" paradigm for a quantum safe zero trust deterministic internet of things (IoT )." IEEE Access 10 (2022): 45893-45930.13. (Year: 2022).*

(Continued)

*Primary Examiner* — Shawnchoy Rahman

(57) ABSTRACT

Automatic vocal contract formation is provided. It is determined whether an indication of acceptance of an audio file and a transcript file corresponding to a verbal communication containing an agreement was received from parties. The audio file and the transcript file having been digitally signed by the parties based on cryptographic private keys associated with a quantum-safe dual signature scheme are exchanged in response to determining that the indication of acceptance was received from each of the parties. Verification of authenticity of the audio file and the transcript file of the vocal contract is received from the parties based on each of the parties successfully verifying digital signatures of the audio file and the transcript file using cryptographic public keys associated with the quantum-safe dual signature scheme.

20 Claims, 7 Drawing Sheets

(56) References Cited

U.S. PATENT DOCUMENTS

| | | | |
|---|---|---|---|
| 2017/0140486 A1 | 5/2017 | Saxena et al. | |
| 2018/0114333 A1 | 4/2018 | Wexler et al. | |
| 2019/0385256 A1 | 12/2019 | Nahamoo et al. | |
| 2021/0306145 A1 | 9/2021 | Krauthamer et al. | |
| 2021/0377049 A1* | 12/2021 | Nix ........................ | H04L 9/0877 |
| 2022/0132213 A1 | 4/2022 | Madisetti et al. | |
| 2022/0321331 A1 | 10/2022 | Kisley et al. | |
| 2022/0353089 A1 | 11/2022 | Masny et al. | |

FOREIGN PATENT DOCUMENTS

| | | | | |
|---|---|---|---|---|
| KR | 102370054 B1 * | 3/2022 | .............. | H04L 9/50 |
| KR | 20220152515 A | 11/2022 | | |

OTHER PUBLICATIONS

Alkhulaifi et al., "Exploring Lattice-based Post-Quantum Signature for JWT Authentication: Review and Case Study," 2020 IEEE 91st Vehicular Technology Conference (VTC2020-Spring), Antwerp, Belgium, May 25-28, 2020, 5 pages.

Gabriel et al., "Post-Quantum Crystography: A Combination of Post-Quantum Cryptography and Steganography," The 8th International Conference for Internet Technology and Secured Transactions (ICITST-2013), London, United Kingdom, Dec. 9-12, 2013, 4 pages.

* cited by examiner

COMPUTING ENVIRONMENT
100

KEY GENERATION AND
SHARING PROCESS
400

FIG. 6A

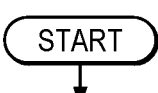

START

602 —
DETERMINE, BY A COMPUTER, THAT A VERBAL COMMUNICATION IS INITIATED BETWEEN PARTIES BASED ON RECEIVING AUDIO INPUTS FROM CLIENT DEVICES CORRESPONDING TO THE PARTIES PARTICIPATING IN THE VERBAL COMMUNICATION VIA A NETWORK, THE COMPUTER ACTS AS A SECURE COMMON COMMUNICATION EXCHANGE PLATFORM BETWEEN THE PARTIES, THE PARTIES VERIFY AN IDENTITY OF EACH OTHER BY EXCHANGING A PRIVATE END-ENTITY CERTIFICATE PROVIDED BY A PRIVATE LOCAL CERTIFICATE AUTHORITY CORRESPONDING TO A GIVEN PARTY PRIOR TO EXCHANGE OF CRYPTOGRAPHIC PUBLIC KEYS ASSOCIATED WITH A DUAL SIGNATURE SCHEME, THE VERBAL COMMUNICATION CONTAINS RELEVANT TERMS OF AN AGREEMENT BETWEEN THE PARTIES

604 —
REMOVE, BY THE COMPUTER, NOISE FROM THE AUDIO INPUTS TO ENHANCE AUDIO QUALITY OF THE VERBAL COMMUNICATION TO PRESERVE SPEAKER RECOGNITION FEATURES

ARE THE SPEAKER RECOGNITION FEATURES PRESERVED?    NO

606    YES

608 —
RECORD, BY THE COMPUTER, THE VERBAL COMMUNICATION CONTAINING THE RELEVANT TERMS OF THE AGREEMENT BETWEEN THE PARTIES WHILE SIMULTANEOUSLY TRANSCRIBING THE VERBAL COMMUNICATION USING NATURAL LANGUAGE PROCESSING TO GENERATE AN AUDIO FILE AND A TRANSCRIPT FILE FORMING A VOCAL CONTRACT CORRESPONDING TO THE VERBAL COMMUNICATION

QUANTUM-SAFE CRYPTOGRAPHY FOR DIGITALLY SIGNED VOCAL CONTRACTS

BACKGROUND

The disclosure relates generally to cryptography and more specifically to using quantum-safe cryptography to secure digitally signed vocal contracts.

Cryptography is the science of coding information so that only intended recipients can read the information. Cryptography relies on mathematical techniques to transform the information into unreadable and unalterable forms using cryptographic keys that are shared or generated by the sender and the intended recipients. There are two main types of cryptography: 1) symmetric key; and 2) asymmetric key. Symmetric key uses the same key to encrypt and decrypt information, while asymmetric key uses one key for encrypting and a different key for decrypting. Cryptography is an evolving field that is used in many areas, such as, for example, information security, network security, digital signatures, blockchain, and the like.

SUMMARY

According to one illustrative embodiment, a computer-implemented method for automatic vocal contract formation is provided. A computer determines whether an indication of acceptance of an audio file and a transcript file of a vocal contract corresponding to a verbal communication containing relevant terms of an agreement was received from parties involved in the vocal contract. The computer exchanges the audio file and the transcript file of the vocal contract having been digitally signed by the parties based on cryptographic private keys associated with a quantum-safe dual signature scheme in response to the computer determining that the indication of acceptance of the audio file and the transcript file of the vocal contract corresponding to the verbal communication containing the relevant terms of the agreement was received from each of the parties. The computer receives verification of authenticity of the audio file and the transcript file of the vocal contract from the parties based on each of the parties successfully verifying digital signatures of the audio file and the transcript file using cryptographic public keys associated with the quantum-safe dual signature scheme that were previously exchanged between the parties. According to other illustrative embodiments, a computer system and computer program product for automatic vocal contract formation are provided.

BRIEF DESCRIPTION OF THE DRAWINGS

FIGS. 6A-6B are a flowchart illustrating a process for automatic vocal contract formation in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
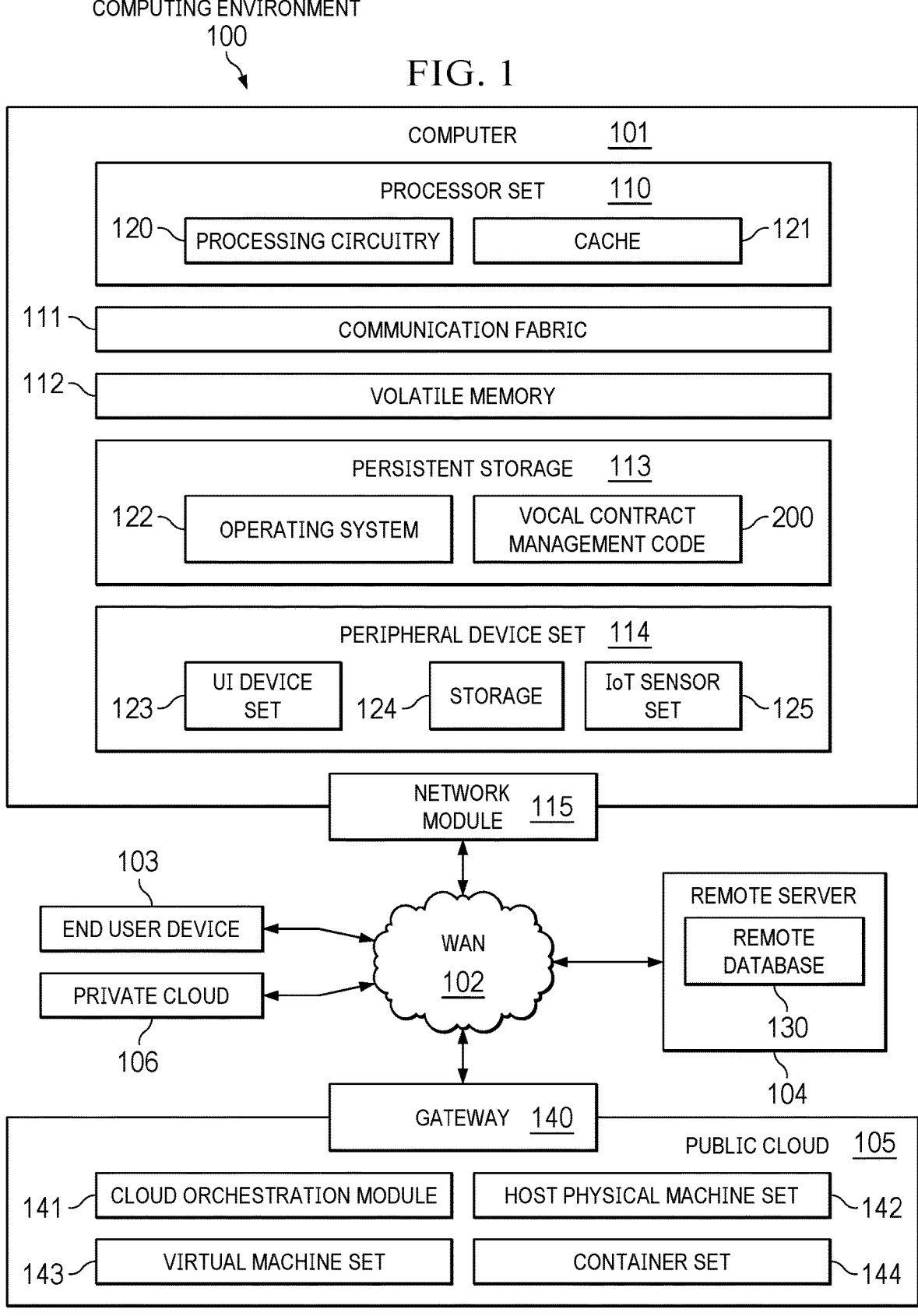
FIG. 1 is a pictorial representation of a computing environment in which illustrative embodiments may be implemented.
Figure 2:
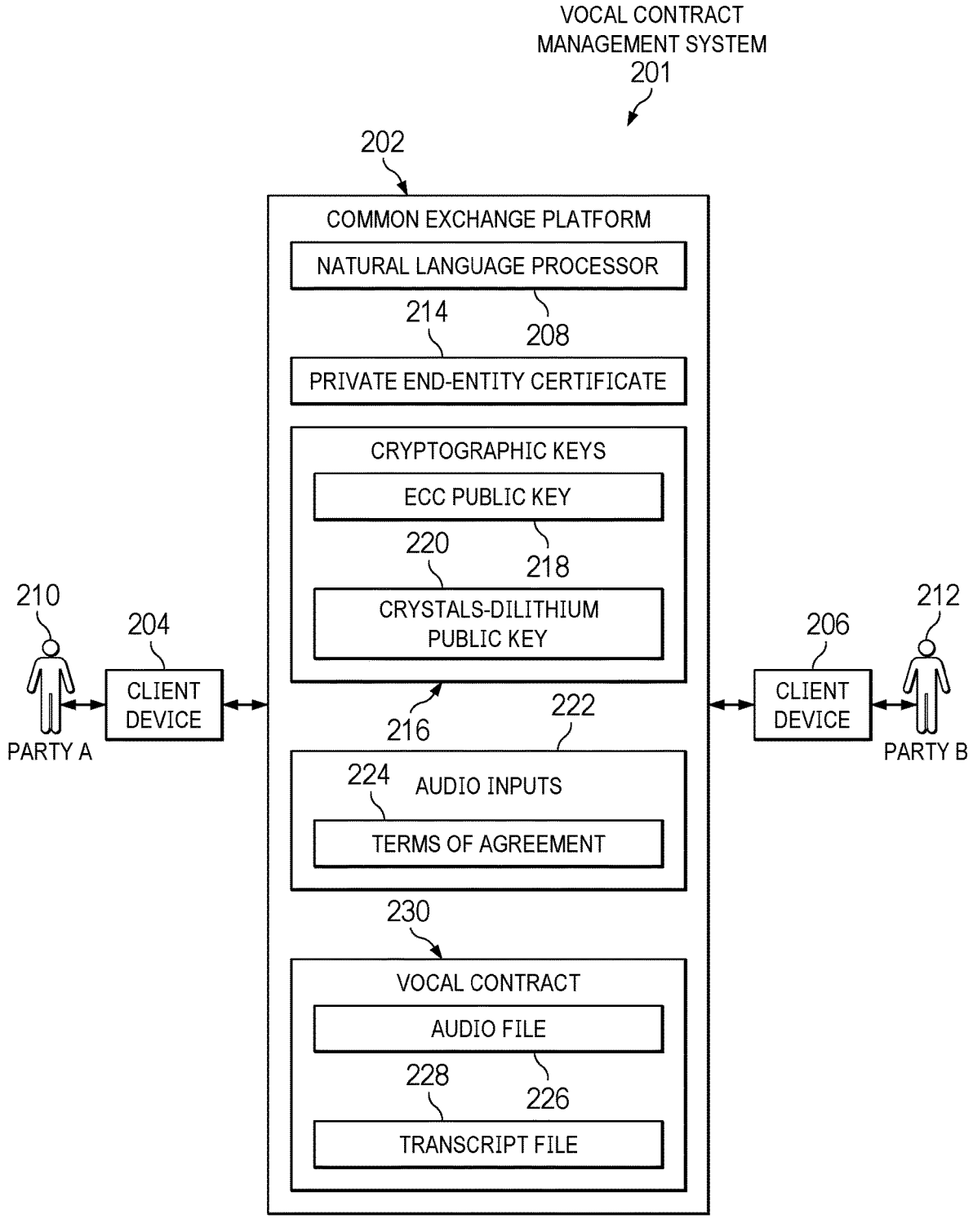
FIG. 2 is a diagram illustrating an example of a vocal contract management system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as vocal contract management code 200. Illustrative embodiments verify and authenticate parties to a vocal contract utilizing private local certificate authorities. Without utilizing a private local certificate authority, it is difficult to determine whether the correct parties are present during a meeting that corresponds to the vocal contract. Illustrative embodiments provide an additional layer of security by having the private local certificate authority verify the end-entity certificates representing the respective parties.

Illustrative embodiments utilize computer 101 as a secure common exchange platform to perform functions such as generating an audio file of a verbal communication between the parties, simultaneously converting speech to text to generate a transcript file (i.e., a textual document of the verbal communication), and distributing the vocal contract, which is comprised of the audio file and transcript file, to each of the respective parties. Computer 101 utilizes, for example, at least one of fractional Gaussian noise processing, recurrent neural network, or the like to enhance audio quality of the verbal communication. A vocal contract as used herein is a legal document that enables recourse when a dispute arises between the parties who digitally sign the vocal contract. Thus, computer 101 centralizes and facilitates the generation and distribution of vocal contracts between parties.

Illustrative embodiments utilize CRYSTALS (Cryptographic Suite for Algebraic Lattices)-Dilithium for post-vocal contract authentication. CRYSTALS-Dilithium is a lattice-based quantum-safe digital signature scheme in which information security is based on the level of difficulty of finding short vectors in lattices. Quantum-safe cryptography (also known as post-quantum, quantum-proof, or quantum-resistant cryptography) refers to cryptographic algorithms, which typically use asymmetric key algorithms, that are believed to be secure against a cryptanalytic attack by a quantum or classical computer. A cryptanalytic attack is used to find vulnerabilities in a cryptographic system.

The strength of a CRYSTALS-Dilithium cryptographic key is represented by the size of its matrix of polynomials. For example, CRYSTALS-Dilithium (6,5) has a matrix size of 6×5. The larger the matrix size, the stronger the cryptographic key. Illustrative embodiments utilize CRYSTALS-Dilithium cryptographic keys for digital signature generation and verification.

Utilizing CRYSTALS-Dilithium ensures that the vocal contract is not manipulated and can be signed without concern of corruption or forgery, creating a legally binding contract. CRYSTALS-Dilithium utilizes private and public cryptographic key pairs. Illustrative embodiments utilize CRYSTALS-Dilithium for digital signature verification of the vocal contract. Without quantum-safe cryptography, the vocal contract digital signatures are subject to attack by a quantum computer using, for example, Shor's algorithm or the like. As a result, illustrative embodiments generate a cryptographically validated immutable vocal contract from a verbal communication containing terms of agreement between the parties.

In addition to computer 101 and vocal contract management code 200, computing environment 100 includes, for example, wide area network (WAN) 102, end user devices (EUDs) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and vocal contract management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods of illustrative embodiments. In computing environment 100, at least some of the instructions for performing the inventive methods of illustrative embodiments may be stored in vocal contract management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The vocal contract management code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUDs 103 are any computer systems that are used and controlled by end users (for example, users of the vocal contract management services provided by computer 101), and may take any of the forms discussed above in connection with computer 101. EUDs 103 typically receive useful data from the operations of computer 101. For example, in a hypothetical case where computer 101 is designed to provide digitally signed files to the end users, these digitally signed files would typically be communicated from network module 115 of computer 101 through WAN 102 to EUDs 103. In this way, EUDs 103 can display, or otherwise present, the digitally signed files to the end users. In some embodiments, EUDs 103 may be client devices, such as thin clients, heavy clients, mainframe computers, desktop computers, tablet computers, smart phones, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A conversation regarding the exchange of goods or services can occur spontaneously in any meeting that is conducted via, for example, telephone conference, video conference, or the like. This conversation can result in a verbal agreement that is not contractually binding. Consequently, a solution is needed to automatically generate a vocal contract of the verbal agreement in real time that is digitally signed and secure.

However, an issue with standard public key cryptographic algorithms is that their security relies on one of three problems: 1) an integer factorization problem; 2) a discrete logarithm problem; or 3) an elliptic-curve discrete logarithm problem. All three of these problems can possibly be solved by a sufficiently powerful quantum computer running, for example, Shor's algorithm or the like.

Illustrative embodiments enable parties involved in the verbal agreement to authenticate each other's identity. After party authentication, illustrative embodiments automatically generate an audio file of the conversation containing the verbal agreement between the parties. Illustrative embodiments also transcribe the audio file to generate a transcript file of the conversation. The audio file and transcript file form the verbal contract between the parties. The parties digitally sign the audio and transcript files using a quantum-safe dual signature scheme to provide a binding vocal contract having two different digital signatures.

As an illustrative use case scenario, illustrative embodiments can generate a vocal contract for a verbal real estate agreement that occurred during an online meeting between an agent and a buyer, while the buyer was viewing the property virtually. As another illustrative use case scenario, illustrative embodiments can generate a vocal contract for a verbal agreement between parties that occurred in a metaverse space regarding a transaction involving exchange of digital assets. As yet another illustrative use case scenario, illustrative embodiments can utilize a secure document management system to store transcripts of multiple conversations between parties over a period of time regarding services to be provided for a fee and then generate a vocal contract from the transcripts of the multiple conversations. It should be noted that the secure document management system can be included in the common exchange platform of illustrative embodiments.

Illustrative embodiments utilize three stages in generating the vocal contract. The first stage occurs during pre-vocal contract validation. The second stage occurs during vocal exchange. The third stage occurs during post-vocal contract authentication.

The "pre-vocal contract validation stage" occurs at the beginning of the conversation between the parties. At the beginning of the conversation, each party validates the party's identity using a private end-entity digital certificate, which is provided by a private local certificate authority that corresponds to that particular party. In other words, the parties verify each other's digital certificate to authenticate identity and any possible representation of an entity, such as, for example, a business, company, enterprise, organization, institution, agency, or the like, by a particular party. Thus, each party needs a private end-entity digital certificate generated by a corresponding private local certificate authority for authentication so that only authenticated parties participate in the agreement on the relevant terms between the parties. These private end-entity digital certificates contain, for example, the individual party's identifying information, contact information, represented entity name if any, and the like. The private local certificate authority that generates the private end-entity digital certificate for a particular party receives its authentication from an intermediate certificate authority, which received its authentication from a root certificate authority. Alternatively, the private local certificate authority that generates the private end-entity digital certificate can receive its authentication directly from the root certificate authority. In addition, the parties exchange digital signature verification cryptographic public keys (e.g., one elliptical curve cryptographic public key and one CRYSTALS-Dilithium cryptographic public key), which correspond to the quantum-safe dual signature scheme, with each other during the pre-vocal contract validation stage.

The "during vocal exchange stage" occurs while the audio file of the verbal communication between the parties is generated and simultaneous speech to text transcription of the audio file is performed using, for example, speech to text technology such as natural language understanding, natural language processing, natural language generation, and the like. As a result, this stage provides one audio file and one transcript file forming the vocal contract that will be reviewed, verified, and agreed upon by the parties for content and context.

For example, all parties participating in the conversation use the common exchange platform as a secure communication medium between the parties. The common exchange platform generates the audio file and the transcript file corresponding to the verbal communication between the parties. In addition, the common exchange platform can also utilize information preserved in the verbal communication (e.g., speaker recognition features) to identify each respective party participating in the verbal communication. For example, the common exchange platform can preserve the features needed for speaker recognition in the audio file.

Further, the common exchange platform can utilize, for example, a recurrent neural network to identify noise patterns and render a noise-cancelled output using a feedforward neural network. As used herein, noise is any unwanted or extraneous sounds (e.g., background noise) captured in the audio input during the verbal communication. It should be noted that the common exchange platform can also utilize other noise processing algorithms, such as, for example, fractional Gaussian noise processing and the like to enhance audio quality. Once the common exchange platform removes the noise from the audio inputs, the common exchange platform then validates the audio inputs for preservation and availability of the speaker recognition features.

Furthermore, the common exchange platform utilizes a time series audio merger algorithm to combine the audio inputs corresponding to each of the respective parties into one audio file corresponding to the verbal communication. This audio file contains segments of voice data from the multiple parties, which the common exchange platform can utilize for speaker recognition. As the common exchange platform generates the audio file of the verbal communication between the parties, the common exchange platform also simultaneously transcribes the audio file into a text document (i.e., the transcript file). Alternatively, the common exchange platform can transcribe the audio file after the common exchange platform has completed generating the audio file for the entire conversation. Moreover, the common exchange platform can utilize a variety of acoustic models and language models as libraries for converting the audio and transcript files to a preferred language of a given party. After the audio file and the transcript file are available, the common exchange platform sends the audio file and the transcript file to all of the parties that participated in the verbal agreement for review.

During the "post-vocal contract authentication stage," after all of the parties confirm the validity of the audio file and the transcript file forming the vocal contract and provide consent to move forward, the parties generate digital signatures for the audio and transcript files using the quantum-safe dual signing scheme. The cryptographic public keys needed for verifying the digital signatures were authenticated and exchanged during the pre-vocal contract validation stage where the initial party authentication process took place. In addition to the standard elliptical curve digital signature algorithm, illustrative embodiments utilize the CRYSTALS-Dilithium lattice-based quantum-safe cryptographic digital signature algorithm. Illustrative embodiments utilize the CRYSTALS-Dilithium lattice-based quantum-safe cryptographic digital signature algorithm because it is resistant to attack by classical and quantum computers.

The common exchange platform shared the audio and transcript files, which are now ready to be digitally signed, with the parties during the vocal exchange stage. The parties can now digitally sign the audio and transcript files using the quantum-safe dual signing scheme. A dual signing scheme is a signature scheme that generates two or more digital signatures for the same file. The parties utilize the standard elliptical curve digital signature algorithm to generate one of the digital signatures and the CRYSTALS-Dilithium lattice-based quantum-safe digital signature algorithm to generate the second digital signature for the file.

Illustrative embodiments can repeat this process for any number of files that are to be digitally signed by the parties. First, a party uses an approved secure hash algorithm, such as, for example, SHA3-512, to generate a hash of the file (i.e., the audio file or the transcript file). Next, the party uses the elliptical curve digital signature algorithm to sign the hash of the file based on the party's elliptical curve cryptographic private key, which results in an elliptical curve cryptographic digital signature for the file. After generating the elliptical curve cryptographic digital signature for the file, the party then uses the CRYSTALS-Dilithium lattice-based quantum-safe digital signature algorithm to also sign that same hash based on the party's CRYSTALS-Dilithium private key to generate a quantum-safe digital signature. The result is two digital signatures for a single hash of the same file. Afterward, illustrative embodiments append both digital signatures of the hash to the file for verification by the other party. Each party receives a corresponding copy of the digitally signed audio file and the digitally signed transcript file forming the vocal contract.

The other party who wants to verify that the audio and transcript files were not modified or tampered with in-transit uses the shared elliptical curve cryptographic public key to verify the elliptical curve cryptographic digital signature and the shared CRYSTALS-Dilithium public key to verify the CRYSTALS-Dilithium digital signature. As part of the verification process, the receiving party generates a hash value of the file and passes the hash value and the corresponding digital signature to the signature verification function of that particular digital signature algorithm. If the elliptical curve cryptographic digital signature verifies and the CRYSTALS-Dilithium digital signature verifies, then the party can be assured that the audio and transcript files were not modified or tampered with by any unauthenticated party and, therefore, file integrity is maintained.

Thus, illustrative embodiments provide one or more technical solutions that overcome a technical problem with quantum computers potentially being able to use an entity's public key to derive the corresponding private key and forge digital signatures on files. As a result, these one or more technical solutions provide a technical effect and practical application in the field of cryptography.

With reference now to FIG. 2, a diagram illustrating an example of a vocal contract management system is depicted in accordance with an illustrative embodiment. Vocal contract management system 201 may be implemented in a computing environment, such as computing environment 100 in FIG. 1. Vocal contract management system 201 is a system of hardware and software components for using quantum-safe cryptography to secure digitally signed vocal contracts against cryptanalytic attack by quantum computers.

In this example, vocal contract management system 201 includes common exchange platform 202, client device 204, and client device 206. Common exchange platform 202 can be, for example, computer 101 in FIG. 1 and includes natural language processor 208. Client device 204 and client device 206 can be, for example, EUDs 103 in FIG. 1 and correspond to Party A 210 and Party B 212, respectively. However, it should be noted that vocal contract management system 201 is intended as an example only and not as a limitation on illustrative embodiments. For example, vocal contract management system 201 can include any number of common exchange platforms, client devices, and other devices and components not shown.

Party A 210 and Party B 212 each exchange private end-entity certificate 214 to verify and authenticate each other prior to conducting any verbal communication containing potential terms of agreement. Party A 210 and Party B 212 exchange their respective private end-entity certificate 214 via common exchange platform 202 using a network, such as, for example, WAN 102 in FIG. 1. Party A 210 and Party B 212 obtain their respective private end-entity certificate 214 from a corresponding private local certificate authority.

After authentication of party identity has been completed, Party A 210 and Party B 212 exchange their respective cryptographic keys 216. Cryptographic keys 216 include elliptical curve cryptographic (ECC) public key 218 and CRYSTALS-Dilithium cryptographic public key 220. Party A 210 and Party B 212 utilize shared ECC public key 218 and CRYSTALS-Dilithium cryptographic public key 220 to verify digital signatures of the files that were sent by the other party and were dual signed using corresponding private keys prior to being sent.

Common exchange platform 202 captures audio inputs 222 containing terms of agreement 224 during verbal communication between Party A 210 and Party B 212. Common exchange platform 202 records captured audio inputs 222 containing terms of agreement 224 in audio file 226. In addition, common exchange platform 202 utilizes natural language processor 208 to simultaneously perform speech to text transcription of the contents of audio file 226 to generate transcript file 228. Audio file 226 and transcript file 228 form vocal contract 230.

At the conclusion of the verbal communication, common exchange platform 202 sends verbal contract 230, which includes audio file 226 and transcript file 228 containing terms of agreement 224, to Party A 210 and Party B 212 for review. Upon acceptance of audio file 226 and transcript file 228 of verbal contract 230, Party A 210 and Party B 212 digitally sign each of audio file 226 and transcript file 228 using both an ECC private key and a CRYSTALS-Dilithium cryptographic private key corresponding to ECC public key 218 and CRYSTALS-Dilithium cryptographic public key 220. After digitally signing their corresponding copy of audio file 226 and transcript file 228 using the quantum-safe dual signature scheme, Party A 210 and Party B 212 exchange the digitally dual signed files for verification using previously exchanged ECC public key 218 and CRYSTALS-Dilithium cryptographic public key 220.

Figure 3:
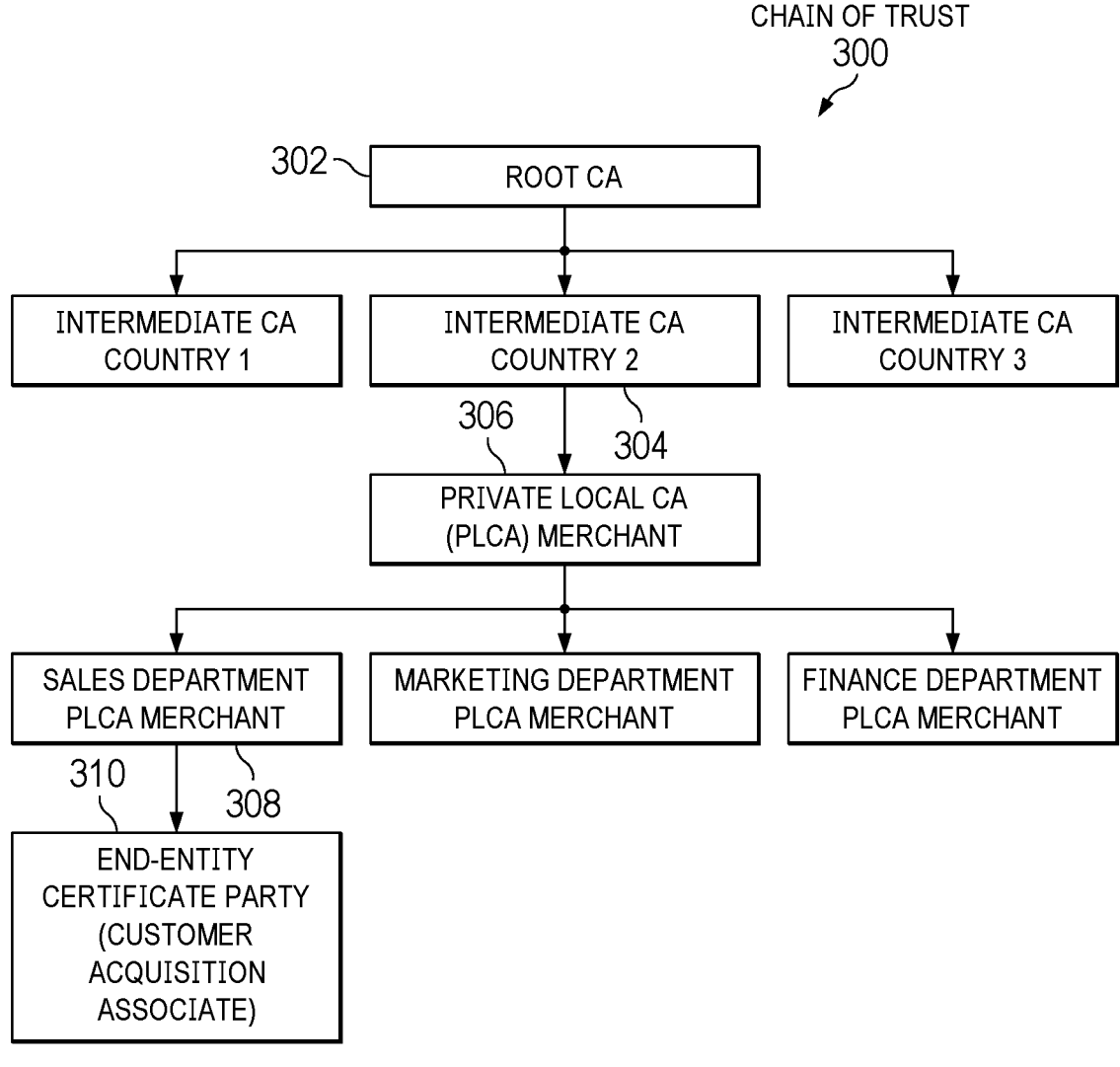
FIG. 3 is a diagram illustrating an example of a chain of trust in accordance with an illustrative embodiment.

With reference now to FIG. 3, a diagram illustrating an example of a chain of trust is depicted in accordance with an illustrative embodiment. Chain of trust 300 can be implemented in a computing environment, such as computing environment 100 in FIG. 1.

In this example, chain of trust 300 includes multiple layers of certificate authorities, each layer providing validation or authentication for a subsequent lower certificate authority layer. For example, root certificate authority (CA) 302 provides validation for intermediate CA 304, which in turn provides validation for private local CA (PLCA) 306, which in turn provides validation for sales department PLCA 308, which in turn provides validation for private end-entity certificate 310. Private end-entity certificate 310 may be, for example, private end-entity certificate 214 in FIG. 2. Private end-entity certificate 310 uniquely identifies a particular party, such as, for example, Party A 210 in FIG. 2, who may represent an entity, such as, for example, a merchant located in a particular country. Root CA 302 may be, for example, a parent entity, a government agency, third-party organization, or the like.

However, it should be noted that chain of trust 300 is intended as an example only and not as a limitation on illustrative embodiments. For example, chain of trust 300 can include any number of certificate authority layers such as 2 layers, 3 layers, 4 layers, 5 layers, 6 layers, or the like.

Figure 4:
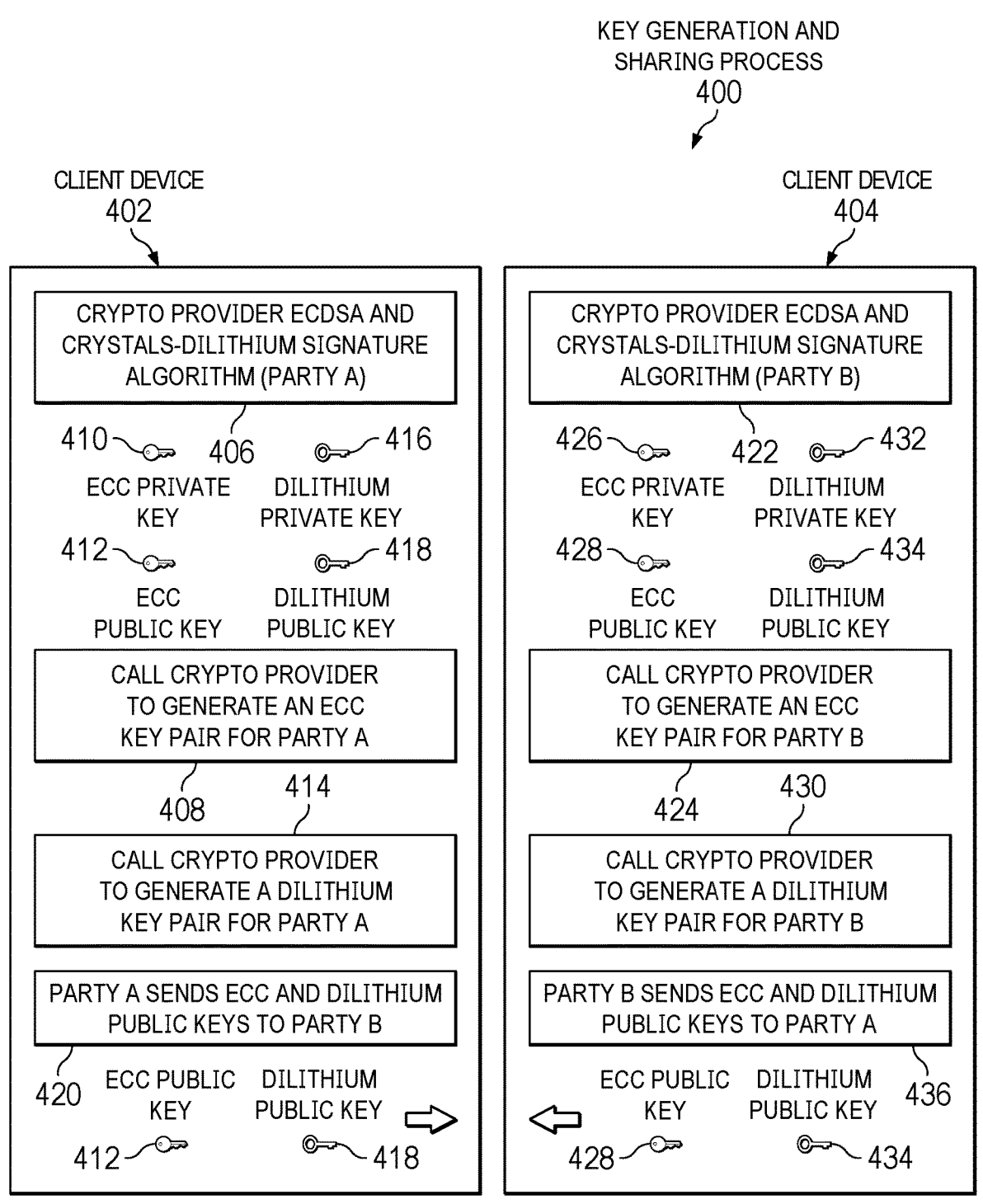
FIG. 4 is a diagram illustrating an example of a key generation and sharing process in accordance with an illustrative embodiment.

With reference now to FIG. 4, a diagram illustrating an example of a key generation and sharing process is depicted in accordance with an illustrative embodiment. Key generation and sharing process 400 can be implemented in a computing environment, such as, for example, vocal contract management system 201 in FIG. 2. At the time of initial party authentication (i.e., at the pre-vocal contract validation stage), cryptographic keys corresponding to the quantum-safe dual signing scheme are generated for each party and the cryptographic keys are exchanged in a secure manner via a common exchange platform, such as, for example, common exchange platform 202 in FIG. 2.

In this example, key generation and sharing process 400 includes client device 402 and client device 404. Client device 402 and client device 404 can be, for example, client device 204 and client device 206 in FIG. 2. However, it should be noted that key generation and sharing process 400 is intended as an example only and not as a limitation on illustrative embodiments. For example, key generation and sharing process 400 can include any number of client devices.

Client device 402 includes cryptographic provider 406, which is comprised of an elliptical curve digital signature algorithm (ECDSA) and a CRYSTALS-Dilithium lattice-based quantum-safe digital signature algorithm. Client device 402 and cryptographic provider 406 correspond to Party A, such as, for example, Party A 210 in FIG. 2. In response to receiving an input from Party A, client device 402, at 408, calls cryptographic provider 406 to generate an elliptical curve cryptographic (ECC) key pair for Party A using the ECC key generation function. The ECC key pair is comprised of ECC private key 410 and ECC public key 412. In addition, at 414, client device 402 calls cryptographic provider 406 to generate a CRYSTALS-Dilithium key pair for Party A using the CRYSTALS-Dilithium key generation function. The CRYSTALS-Dilithium key pair is comprised of CRYSTALS-Dilithium private key 416 and CRYSTALS-Dilithium public key 418. At 420, Party A sends ECC public key 412 and CRYSTALS-Dilithium public key 418 to client device 404 corresponding to Party B, such as, for example, Party B 212 in FIG. 2.

Client device 404 includes cryptographic provider 422, which is comprised of an ECDSA and a CRYSTALS-Dilithium lattice-based quantum-safe digital signature algorithm corresponding to Party B. In response to receiving an input from Party B, client device 404, at 424, calls cryptographic provider 422 to generate an ECC key pair for Party B using the ECC key generation function. The ECC key pair is comprised of ECC private key 426 and ECC public key 428. Further, at 430, client device 404 calls cryptographic provider 422 to generate a CRYSTALS-Dilithium key pair for Party B using the CRYSTALS-Dilithium key generation function. The CRYSTALS-Dilithium key pair is comprised of CRYSTALS-Dilithium private key 432 and CRYSTALS-Dilithium public key 434. At 436, Party B sends ECC public key 428 and CRYSTALS-Dilithium public key 434 to client device 402 corresponding to Party A.

Figure 5:
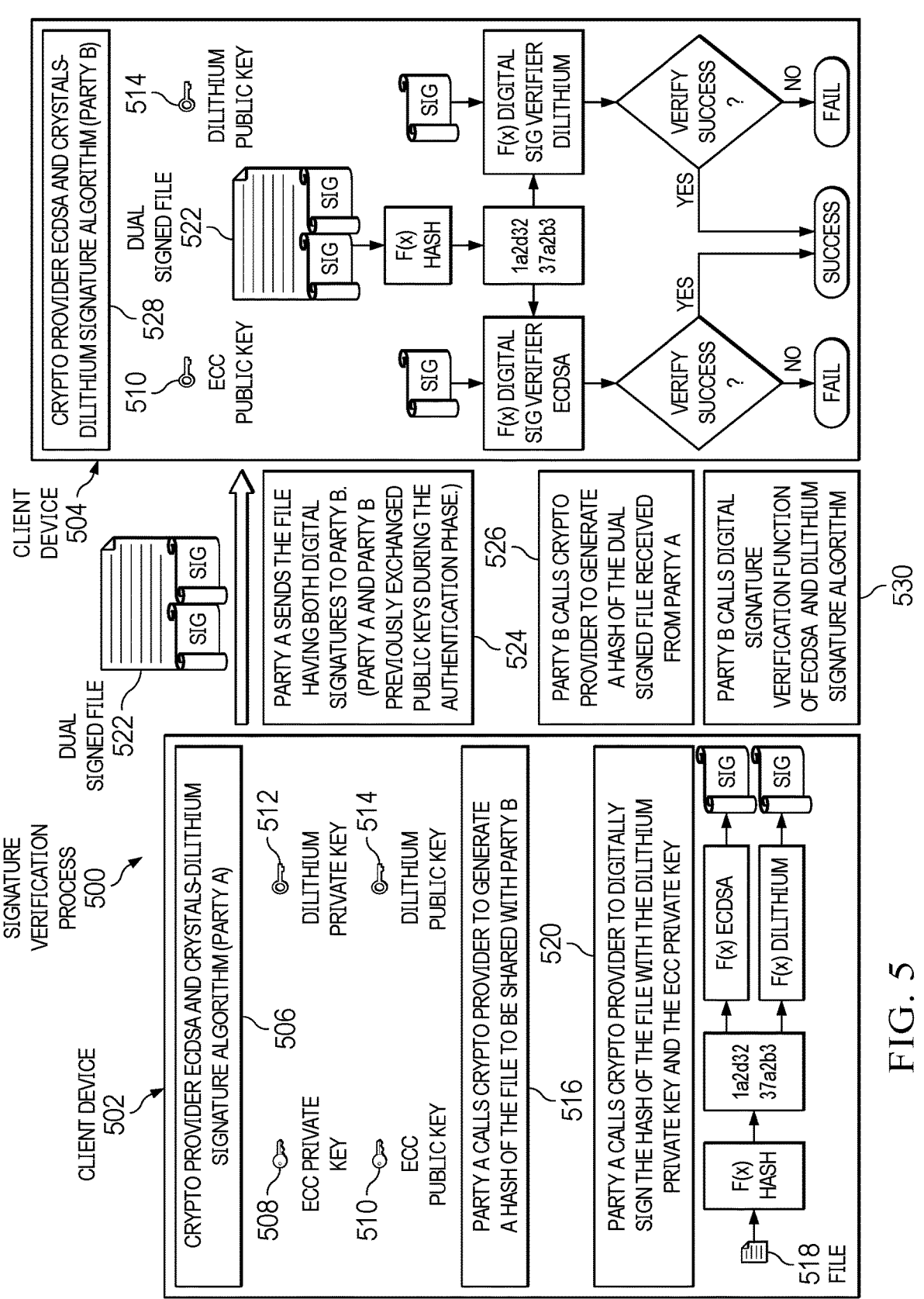
FIG. 5 is a diagram illustrating an example of a signature verification process in accordance with an illustrative embodiment.

With reference now to FIG. 5, a diagram illustrating an example of a signature verification process is depicted in accordance with an illustrative embodiment. Signature verification process 500 can be implemented in a computing environment, such as, for example, vocal contract management system 201 in FIG. 2. It should be noted that the digital signature verification steps are identical for Party A and Party B. In this illustrative example, Party A is the signer using the quantum-safe dual signature scheme of illustrative embodiments and Party B is the verifier. In addition, signature verification process 500 is the same for each shared file (e.g., audio file 226 and transcript file 228 in FIG. 2).

In this example, signature verification process 500 includes client device 502 and client device 504. Client device 502 and client device 504 can be, for example, client device 402 and client device 404 in FIG. 4. However, it should be noted that signature verification process 500 is intended as an example only and not as a limitation on illustrative embodiments. For example, signature verification process 500 can include any number of client devices.

Client device 502 includes cryptographic provider 506, which is comprised of an elliptical curve digital signature algorithm (ECDSA) and a CRYSTALS-Dilithium lattice-based quantum-safe digital signature algorithm. Client device 502 and cryptographic provider 506 correspond to Party A. Cryptographic provider 506 generates elliptical curve cryptographic (ECC) private key 508, ECC public key 510, CRYSTALS-Dilithium private key 512, and CRYSTALS-Dilithium public key 514 for Party A. ECC private key 508, ECC public key 510, CRYSTALS-Dilithium private key 512, and CRYSTALS-Dilithium public key 514 can be, for example, ECC private key 410, ECC public key 412, CRYSTALS-Dilithium private key 416, and CRYSTALS-Dilithium public key 418 in FIG. 4.

At 516, Party A calls cryptographic provider 506 to generate a hash of file 518, which is to be shared with Party B. File 518 may be, for example, the audio file or the transcript file of the vocal contract. However, it should be noted that both the audio file and the transcript file will be shared with Party B. Afterward, at 520, Party A calls cryptographic provider 506 to digitally sign the hash of file 518 using ECC private key 508 and CRYSTALS-Dilithium private key 512. Cryptographic provider 506 then appends the dual signed hash to file 518 to form dual signed file 522.

At 524, Party A sends dual signed file 522 with both digital signatures appended to Party B via a common exchange platform, such as, for example, common exchange platform 202 in FIG. 2. It should be noted that Party A previously sent ECC public key 510 and CRYSTALS-Dilithium public key 514 to Party B for digital signature verification purposes.

At 526, Party B calls cryptographic provider 528 on client device 504 to generate a hash of dual signed file 522 received from Party A. Afterward, at 530, Party B calls the digital signature verification function of the ECDSA and the CRYSTALS-Dilithium lattice-based quantum-safe digital signature algorithm to verify both digital signatures of dual signed file 522 using ECC public key 510 and CRYSTALS-Dilithium public key 514. In other words, the digital signature verification function verifies the digital signatures of file 518 using the corresponding public keys (i.e., ECC public key 510 and CRYSTALS-Dilithium public key 514) and determines whether the digital signatures successfully verify. Digital signature verification success indicates file integrity and authorship by the owner of the public keys (i.e., Party A in this example). Conversely, digital signature verification failure indicates file corruption or failed authentication.

Figure 6B:
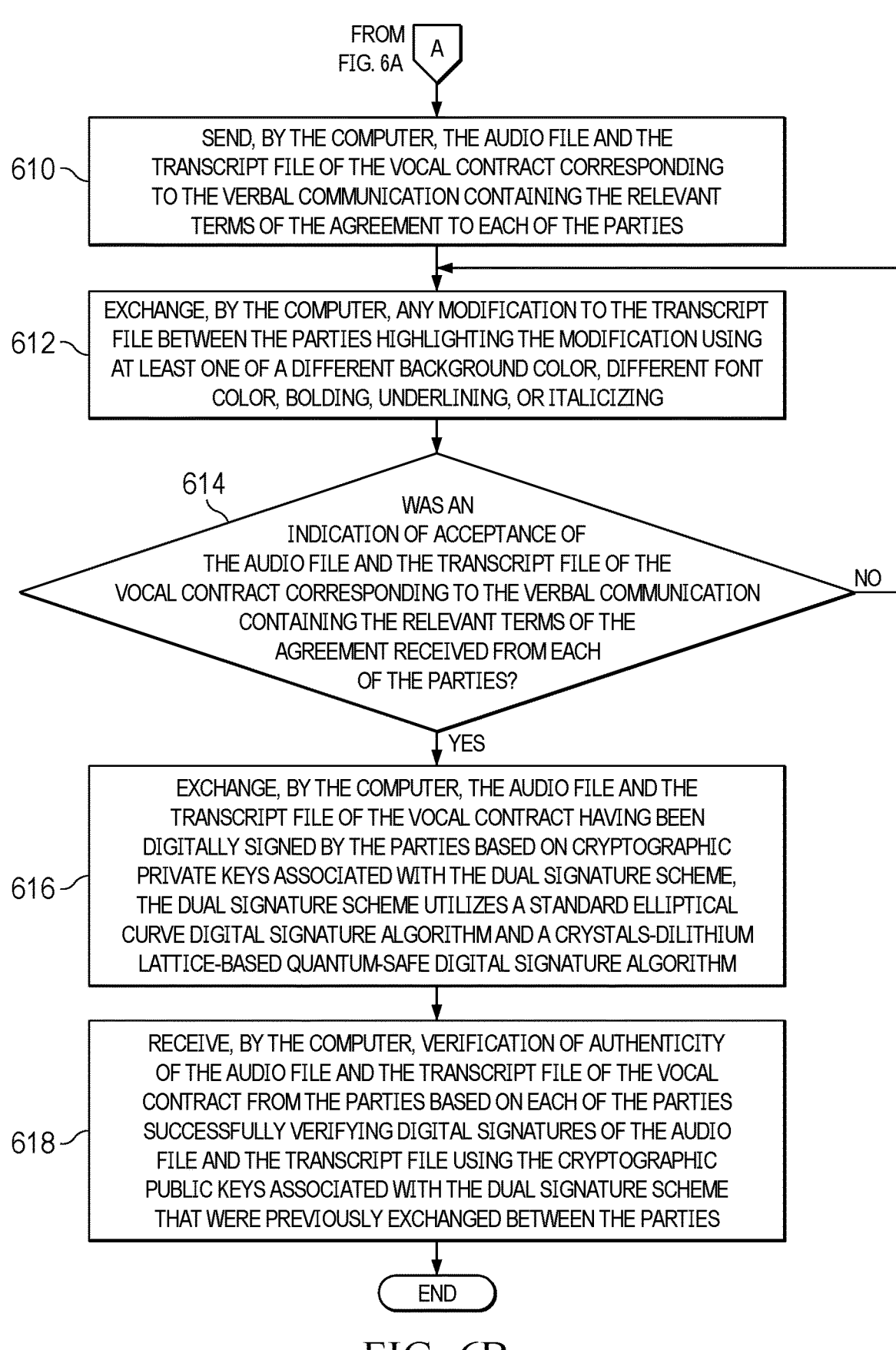

With reference now to FIGS. 6A-6B, a flowchart illustrating a process for automatic vocal contract formation is shown in accordance with an illustrative embodiment. The process shown in FIGS. 6A-6B may be implemented in a computer, such as, for example, computer 101 in FIG. 1 or common exchange platform 202 in FIG. 2. For example, the process shown in FIGS. 6A-6B may be implemented in vocal contract management code 200 in FIG. 1.

The process begins when the computer determines that a verbal communication is initiated between parties based on receiving audio inputs from client devices corresponding to the parties participating in the verbal communication via a network (step 602). The computer acts as a secure common communication exchange platform between the parties. The parties verify an identity of each other by exchanging a private end-entity certificate provided by a private local certificate authority corresponding to a given party prior to exchange of cryptographic public keys associated with the quantum-safe dual signature scheme. The verbal communication contains relevant terms of an agreement between the parties.

In response to receiving the audio inputs, the computer removes noise from the audio inputs to enhance audio quality of the verbal communication to preserve speaker recognition features (step 604). The computer makes a determination as to whether the speaker recognition features are preserved (step 606). If the computer determines that the speaker recognition features are not preserved, no output of step 606, then the process returns to step 604 where the compute continues to remove the noise from the audio inputs. If the computer determines that the speaker recognition features are preserved, yes output of step 606, then the computer records the verbal communication containing the relevant terms of the agreement between the parties while simultaneously transcribing the verbal communication using natural language processing to generate an audio file and a transcript file forming a vocal contract corresponding to the verbal communication (step 608). The computer utilizes the speaker recognition features to identify each party speaking in the audio file.

The computer sends the audio file and the transcript file of the vocal contract corresponding to the verbal communication containing the relevant terms of the agreement to each of the parties (step 610). Further, the computer exchanges any modification to the transcript file between the parties highlighting the modification using at least one of a different background color, different font color, bolding, underlining, or italicizing (step 612).

The computer makes a determination as to whether an indication of acceptance of the audio file and the transcript file of the vocal contract corresponding to the verbal communication containing the relevant terms of the agreement was received from each of the parties (step 614). If the computer determines that no indication of acceptance of the audio file and the transcript file of the vocal contract corresponding to the verbal communication containing the relevant terms of the agreement was received from each of the parties, no output of step 614, then the process returns to step 612 where the compute continues to exchange any modifications to the transcript file. If the computer determines that the indication of acceptance of the audio file and the transcript file of the vocal contract corresponding to the verbal communication containing the relevant terms of the agreement was received from each of the parties, yes output of step 614, then the computer exchanges the audio file and the transcript file of the vocal contract having been digitally signed by the parties based on cryptographic private keys associated with the quantum-safe dual signature scheme (step 616). The quantum-safe dual signature scheme utilizes a standard elliptical curve digital signature algorithm and a CRYSTALS-Dilithium lattice-based quantum-safe digital signature algorithm.

Subsequently, the computer receives verification of authenticity of the audio file and the transcript file of the vocal contract from the parties based on each of the parties successfully verifying digital signatures of the audio file and the transcript file using the cryptographic public keys associated with the quantum-safe dual signature scheme that were previously exchanged between the parties (step 618). Thereafter, the process terminates.

Thus, illustrative embodiments of the present invention provide a computer-implemented method, computer system, and computer program product for using quantum-safe cryptography to secure digitally signed vocal contracts from cryptanalytic attack by quantum computers. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for automatic vocal contract formation, the computer-implemented method comprising:

determining, by a computer, whether an indication of acceptance of an audio file and a transcript file of a vocal contract corresponding to a verbal communication containing relevant terms of an agreement was received from parties involved in the vocal contract;

exchanging, by the computer, the audio file and the transcript file of the vocal contract having been digitally signed by the parties based on cryptographic private keys associated with a quantum-safe dual signature scheme in response to the computer determining that the indication of acceptance of the audio file and the transcript file of the vocal contract corresponding to the verbal communication containing the relevant terms of the agreement was received from each of the parties; and receiving, by the computer, verification of authenticity of the audio file and the transcript file of the vocal contract from the parties based on each of the parties successfully verifying digital signatures of the audio file and the transcript file using cryptographic public keys associated with the quantum-safe dual signature scheme that were previously exchanged between the parties.

2. The computer-implemented method of claim 1, wherein the quantum-safe dual signature scheme utilizes an elliptical curve digital signature algorithm and a CRYSTALS-Dilithium digital signature algorithm.

3. The computer-implemented method of claim 1, further comprising:

determining, by the computer, that the verbal communication is initiated between the parties based on receiving audio inputs from client devices corresponding to the parties participating in the verbal communication via a network, wherein the computer acts as a secure exchange platform between the parties; and removing, by the computer, noise from the audio inputs to enhance audio quality of the verbal communication to preserve speaker recognition features in response to receiving the audio inputs, wherein the computer utilizes the speaker recognition features to identify each party speaking in the audio file.

4. The computer-implemented method of claim 1, further comprising:

recording, by the computer, the verbal communication between the parties while simultaneously transcribing the verbal communication to generate the audio file and the transcript file forming the vocal contract corresponding to the verbal communication.

5. The computer-implemented method of claim 1, further comprising:

sending, by the computer, the audio file and the transcript file of the vocal contract corresponding to the verbal communication to each of the parties; and exchanging, by the computer, any modification to the transcript file between the parties highlighting the modification using at least one of a different background color, different font color, bolding, underlining, or italicizing.

6. The computer-implemented method of claim 1, wherein the parties verify an identity of each other by exchanging a private end-entity certificate provided by a private local certificate authority corresponding to a given party prior to exchange of the cryptographic public keys associated with the quantum-safe dual signature scheme.

7. The computer-implemented method of claim 1, wherein the vocal contract is a legal document that enables recourse when a dispute arises between the parties who digitally signed the vocal contract.

8. A computer system for automatic vocal contract formation, the computer system comprising:

a communication fabric;

a storage device connected to the communication fabric, wherein the storage device stores program instructions; and a processor connected to the communication fabric, wherein the processor executes the program instructions to:

determine whether an indication of acceptance of an audio file and a transcript file of a vocal contract corresponding to a verbal communication containing relevant terms of an agreement was received from parties involved in the vocal contract;

exchange the audio file and the transcript file of the vocal contract having been digitally signed by the parties based on cryptographic private keys associated with a quantum-safe dual signature scheme in response to determining that the indication of acceptance of the audio file and the transcript file of the vocal contract corresponding to the verbal communication containing the relevant terms of the agreement was received from each of the parties; and receive verification of authenticity of the audio file and the transcript file of the vocal contract from the parties based on each of the parties successfully verifying digital signatures of the audio file and the transcript file using cryptographic public keys associated with the quantum-safe dual signature scheme that were previously exchanged between the parties.

9. The computer system of claim 8, wherein the quantum-safe dual signature scheme utilizes an elliptical curve digital signature algorithm and a CRYSTALS-Dilithium digital signature algorithm.

10. The computer system of claim 8, wherein the processor further executes the program instructions to:

determine that the verbal communication is initiated between the parties based on receiving audio inputs from client devices corresponding to the parties participating in the verbal communication via a network, wherein the computer system acts as a secure exchange platform between the parties; and remove noise from the audio inputs to enhance audio quality of the verbal communication to preserve speaker recognition features in response to receiving the audio inputs, wherein the computer system utilizes the speaker recognition features to identify each party speaking in the audio file.

11. The computer system of claim 8, wherein the processor further executes the program instructions to:

record the verbal communication between the parties while simultaneously transcribing the verbal communication to generate the audio file and the transcript file forming the vocal contract corresponding to the verbal communication.

12. The computer system of claim 8, wherein the processor further executes the program instructions to:

send the audio file and the transcript file of the vocal contract corresponding to the verbal communication to each of the parties; and exchange any modification to the transcript file between the parties highlighting the modification using at least one of a different background color, different font color, bolding, underlining, or italicizing.

13. The computer system of claim 8, wherein the parties verify an identity of each other by exchanging a private end-entity certificate provided by a private local certificate authority corresponding to a given party prior to exchange of the cryptographic public keys associated with the quantum-safe dual signature scheme.

14. A computer program product for automatic vocal contract formation, the computer program product comprising a computer-readable storage medium having program instructions embodied therewith, the program instructions executable by a computer to cause the computer to perform a method of:

determining, by the computer, whether an indication of acceptance of an audio file and a transcript file of a vocal contract corresponding to a verbal communication containing relevant terms of an agreement was received from parties involved in the vocal contract;

exchanging, by the computer, the audio file and the transcript file of the vocal contract having been digitally signed by the parties based on cryptographic private keys associated with a quantum-safe dual signature scheme in response to the computer determining that the indication of acceptance of the audio file and the transcript file of the vocal contract corresponding to the verbal communication containing the relevant terms of the agreement was received from each of the parties; and receiving, by the computer, verification of authenticity of the audio file and the transcript file of the vocal contract from the parties based on each of the parties successfully verifying digital signatures of the audio file and the transcript file using cryptographic public keys associated with the quantum-safe dual signature scheme that were previously exchanged between the parties.

15. The computer program product of claim 14, wherein the quantum-safe dual signature scheme utilizes an elliptical curve digital signature algorithm and a CRYSTALS-Dilithium digital signature algorithm.

16. The computer program product of claim 14, further comprising:

determining, by the computer, that the verbal communication is initiated between the parties based on receiving audio inputs from client devices corresponding to the parties participating in the verbal communication via a network, wherein the computer acts as a secure exchange platform between the parties; and removing, by the computer, noise from the audio inputs to enhance audio quality of the verbal communication to preserve speaker recognition features in response to receiving the audio inputs, wherein the computer utilizes the speaker recognition features to identify each party speaking in the audio file.

17. The computer program product of claim 14, further comprising:

recording, by the computer, the verbal communication between the parties while simultaneously transcribing the verbal communication to generate the audio file and the transcript file forming the vocal contract corresponding to the verbal communication.

18. The computer program product of claim 14, further comprising:

sending, by the computer, the audio file and the transcript file of the vocal contract corresponding to the verbal communication to each of the parties; and exchanging, by the computer, any modification to the transcript file between the parties highlighting the modification using at least one of a different background color, different font color, bolding, underlining, or italicizing.

19. The computer program product of claim 14, wherein the parties verify an identity of each other by exchanging a private end-entity certificate provided by a private local certificate authority corresponding to a given party prior to exchange of the cryptographic public keys associated with the quantum-safe dual signature scheme.

20. The computer program product of claim 14, wherein the vocal contract is a legal document that enables recourse when a dispute arises between the parties who digitally signed the vocal contract.

\* \* \* \* \*